United States Patent [19]

Miyauchi

[11] 4,051,230
[45] Sept. 27, 1977

[54] LIQUID-LIQUID EXTRACTION PROCESS OF METALS

[75] Inventor: Terukatsu Miyauchi, Yokohama, Japan

[73] Assignee: W. L. Gore & Associates, Inc., Newark, Del.

[21] Appl. No.: 533,645

[22] Filed: Dec. 17, 1974

[30] Foreign Application Priority Data

Dec. 18, 1973  Japan .................. 48-142040

[51] Int. Cl.² ........................................... B01D 11/04
[52] U.S. Cl. ........................... 423/658.5; 75/101 BE; 210/22 R; 210/23 R; 210/24; 210/38 B; 423/8; 423/24; 423/54; 423/63; 423/99; 423/70; 423/89; 423/112; 423/139; 423/22; 423/21; 23/267 R; 23/267 A
[58] Field of Search .................. 423/658.5, 8–10, 423/24, 54, 63, 70, 89, 112, 139; 75/101 BE; 210/24, 38, 22, 23 R

[56] References Cited

U.S. PATENT DOCUMENTS

| 3,228,877 | 1/1966 | Mahon ........................ 210/22 |
| 3,450,631 | 6/1969 | Block et al. ................. 210/22 |
| 3,718,583 | 2/1973 | Wu et al. ..................... 210/22 |
| 3,779,907 | 12/1973 | Li et al. ..................... 210/38 X |
| 3,872,001 | 3/1975 | Davis et al. ............... 75/101 BE |

Primary Examiner—Herbert T. Carter
Attorney, Agent, or Firm—E. A. Uebler; J. S. Campbell

[57] ABSTRACT

In this process metal ions such as $Ag^+$, $Pb^{2+}$, $Co^{2+}$, $Cu^{2+}$, $Fe^{3+}$, etc., are extracted through a porous membrane impregnated with the first extractant containing chelating agents. The membrane contacts with an extraction feed on one side, and with the second extractant on the other side, and the objective metal ions are transferred from the feed to the second extractant. Throughout the extraction process, the pH values of the extraction feed, the impregnated extractant solution, and the second extractant are kept in decreasing order.

An apparatus used for the above objective is also provided by this invention.

7 Claims, 4 Drawing Figures

LIQUID-LIQUID EXTRACTION PROCESS OF METALS

BACKGROUND OF THE INVENTION

1. Field of the Invention

The present invention relates to a liquid-liquid extraction process, more particularly it relates to a provision of a novel process for extracting a metal ion $M^{n+}$ from an aqueous dilute solution containing said metal ion(s) through a porous membrane impregnated with a chelating agent containing solution.

The present invention further relates to an apparatus used for the liquid-liquid extraction process.

2. Description of the Prior Art

The liquid-liquid extraction process which utilizes chemical equilibrium between a complexing reagent (e.g. liquid ion exchanger, chelating reagent, carboxilic acid compound, etc.) in an organic solvent immissible with water and a metal ion in an aqueous solution has been widely used in the field of analytical chemistry on a laboratory scale. This process has also been used in nuclear industry, and in extractive metallurgy in an industrial scale. In addition, the conventional liquid-liquid extraction process may be applicable to the treatment of waste water.

When the conventional solvent extraction process is carried out in an industrial scale, metal ions are firstly extracted from their aqueous solution by an extractor (e.g., mixersettler type extractor, continuous counter current column extractor), and the extracted metal ions are secondly stripped from the organic solvent layer into an aqueous phase. In such conventional processes, at least two steps and large scale equipment, e.g. towers, have necessarily been employed.

However, the conventional method is expected to be improved by bringing raw feed solution into contact with an absorption solution via a porous film impregnated with an organic complexing agent solution (i.e., liquid film) so that the two processes may be combined into one operation with a compact extractor-stripper equipment. Use of the liquid film will increase the efficiency of contact of a raw feed solution with an absorption solution by use of a bundle of tubes and baffles, no problem concerning separation of the solutions being involved. Such an improved process using a liquid film impregnated with an organic complex agent solution has not yet been found.

SUMMARY OF THE INVENTION

It is therefore an object of the present invention to provide a novel liquid-liquid extraction process of metals from a metal ion containing solution (hereinafter "extraction feed") which utilizes a porous film impregnated with an organic solution containing a chelating agent.

It is another object of this invention to provide a liquid-liquid extraction apparatus therefor.

These and other objects have been attained by the process of this invention, which comprises impregnating a porous membrane with a first extractant which contains a chelating agent, bringing said impregnated membrane into contact with an extraction feed on one side of the membrane, and bringing said impregnated membrane into contact with a second extractant on the other side of the membrane, while keeping the pH values of the feed and the first and second extractants in a specific relationship hereinafter stated. The above and other objects have also been accomplished by an apparatus which is constructed to perform the process mentioned above.

DETAILED DESCRIPTION OF THE INVENTION

Figure 1:
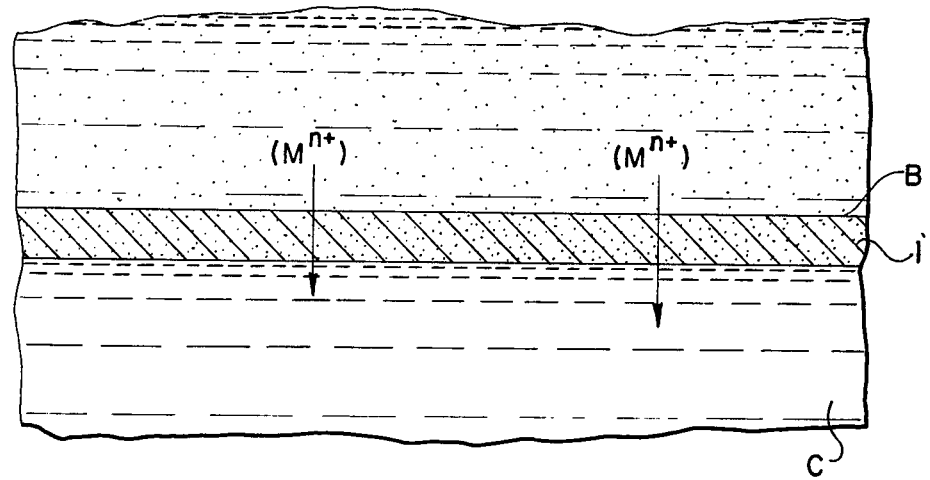
FIG. 1 is an enlarged section of a porous membrane impregnated with the first extractant containing a chelating agent, and serves to explain the principle of the present invention.

As means to accomplish the above objectives, the present invention utilizes a porous membrane 1, which has continuous fine pores, and the pores of which are impregnated with a first extractant solution containing a chelating agent(s).

The impregnated membrane which holds a first extractant in its fine pores serves as a liquid membrane. The membrane is brought into contact with an extraction feed A on one side, and with a second extractant C on the other side, while the pH value of an extraction feed A being greater than that of the extractant C. Preferably the pH values of the extraction feed, the first extractant, and the second extractant are kept in decreasing order.

According to the principle of liquid-liquid extraction, the first extractant B is immiscible or difficulty soluble with the solvent of the extraction feed A, but it dissolves the chelates of the objective metal ion $M^{n+}$. The metal ion(s) ($M^{n+}$) extracted by the present invention include, for example, $Ag^+$, $Pb^{2+}$, $Cu^{2+}$, $Fe^{3+}$, $Mn^{2+}$, $Ni^{2+}$, $Fe^{2+}$, $Co^{2+}$, $Cd^{2+}$, $Zn^{2+}$, $Cr^{3+}$, $Cu^{2+}$, $Bi^{3+}$, $Pd^{2+}$, $U$, etc. The extraction feed (A) is usually an aqueous dilute solution containing one or more of the above metal ions. The concentration and the pH value of the extraction feed are controlled by the method hereinafter stated.

The second extractant C is immiscible or difficultly soluble with the first extractant, and it dissolves the objective metal ion $M^{n+}$. The second extractant is generally an aqueous solution. The chelating agent(s) dissolved in the first extractant forms a metal chelate(s) with the objective metal ion(s) $M^{n+}$, and the chelate formed by the reaction between the chelating agent and the objective metal ion $M^{n+}$ must be soluble to the first extractant B.

The first extractant B is usually an organic solution in which a chelating agent is dissolved. The organic solvent and chelating agent are optionally selected from conventional solvents under consideration of the above conditions and the condition for selecting membranes hereinafter stated.

The examples of the organic solvent used for preparing a chelating solution include benzene, toluene, xylene, carbon tetrachloride, chloroform; ketones such as methylethylketone, acetone, methylisobutylketone; kerosene; silicone oil; chlorinated hydrocarbons; their equivalents; and mixture solvents thereof.

Chelating agents useful in the present invention include, for example β-diketones such as acetylacetone, trifluoroacetylacetone, dibenzoylmethane, thenoyltrifluoroacetone (TTA or HTTA); quinolines such as 8-hydroxyquinoline (oxine); oximes and dioximes such as N-nitrosophenylhydroxylamine ammonium (cupferron), N-benzoyl-N-pheynlhydroxylamine (NBPHA), N-furoylphenylhydroxylamine; dithizones; mixtures thereof; and the like.

The porous membrane having continuous pores shall be wetted and impregnated easily with the first extractant B, and hold the impregnant to form a liquid membrane, but the membrane shall be difficult to wet with the extraction feed A and the second extractant C. The membrane is to be thin, to have an adequate mechanical strength, and to be chemically resistant. Considering the foregoing conditions, the useful membrane can be selected from various conventional membranes such as porous plastic membranes, sintered porous metal membranes, glass filter, ceramics filter, paper filter, various kinds of fibrous filters, etc. Among these, a porous membrane obtained by expanding thermoplastic crystalline polymer is more suitable. Above all, a porous polytetrafluoroethylene (hereinafter "PTFE") membrane is the most suitable one, especially when the extraction feed A and the second extractant C are aqueous solutions, and the first extractant is an organic solvent. A suitable porous PTFE membrane is obtained by the methods described in the Japanese Patent Disclosure Sho 46-7284, or the Japanese Patent Publication Sho 42-13560.

The reason why this membrane is suitable for use in this invention is: (1) a stable liquid membrane containing the first extractant B being formed due to its adequate wettability to organic solvents and to its non-wettability to water; (2) the membrane sheet having quite thin thickness and very large porosity being obtained; (3) the membrane having excellent mechanical strength, chemical resistance, stability, and durability; and (4) the membrane being easily available in any shape (tube, rod, etc.) and size, and at a reasonable cost.

The pH values of the above mentioned solutions A, B, and C are adjusted, for example, in the following manner.

First, the pH value of the extractant B (hereinafter $(pH)_{1/2}$) is determined by the type of the organic solvent and of the chelating agent to be added, and the amounts thereof. The $(pH)_{1/2}$ also depends on the type of the metal ions. Second, the pH value of the extraction feed A (hereinafter $(pH)_A$) and the pH value of the extractant C (hereinafter $(pH)_C$) are adjusted by adding a suitable adjustor such as sulfuric acid, nitric acid, sodium acetate, sodium hydroxide, etc. Thus, the pH values are controlled, in decreasing order of pH; $(pH)_A > (pH)_{1/2} > (pH)_C$, where the absolute differences $((pH)_A - (pH)_B)$ and $((pH)_{1/2} - (pH)_C)$ are generally positive, preferably ranging from 1 to 3, more particularly from 1 to 1.5 in order to sufficiently perform the extraction.

The extraction principle will be briefly explained hereinafter. The chelating agent added to the first extractant B, which is referred to as HL, H: hydrogen, L: chelating reagent radical, dissolves as being shown in Equation (1). These dissociated components H+ and L- react with the metal ion M$^{n+}$ in the extraction feed A at the interface, mainly in the aqueous mass-transfer film attached to the interface, between the extraction feed A and the first extractant B. The reaction mechanism is expressed as follows:

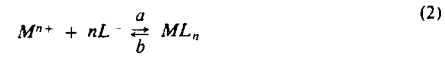

As the $(pH)_A$ is higher than $(pH)_{1/2}$, the reaction represented by Equation (2) proceeds in a direction shown by the arrow $a$, and the metal chelate compound formed dissolves into the first extractant B. In other words, the metal ion M$^{n+}$, i.e. solute, is extracted from the extraction feed A into the first extractant B in the form of metal chelate $ML_n$. The metal chelate $ML_n$ thus extracted diffuses through the organic liquid membrane of the first extractant B, and it reaches to the other interface between the first extractant B and the second extractant C. As the $(pH)_{1/2}$ is higher than $(pH)_C$ at the interface, there occurs a dissociation reaction shown in the above Equation (2) at the arrow $b$, and the metal ion M$^{n+}$ is extracted into the second extractant C according to the dissociation reaction. At the same time, the regenerated chelating agent back-diffuses through the liquid membrane to react again with the metal ion in the extraction feed.

Further explanation is made about the above Equation (2). When the total metal concentration in the extraction feed is referred to as $[M]_A$, and that of the first extractant B as $[M]_B$, the partition coefficient E of the metal between both solutions is represented by the following equation.

$$E = \frac{[M]_B}{[M]_A} \quad (3)$$

This partition coefficient varies with the pH value of the extractant, when the other conditions such as the type and concentration of chelating agent, the type of the organic solvent and metal are unchanged. Now, define the pH value of the extraction feed A as $(pH)_{1/2}$ at which the metal concentrations of both phases A and B are equal with each other, i.e., E = 1. When the pH value, $(pH)_A$, of the extraction feed A is greater than the $(pH)_{1/2}$, the reaction expressed by Equation (2) proceeds in the direction of $a$. Thus, more $ML_n$ is formed, and the metal is partitioned more into the extractant B (i.e., E becomes greater than unity). When the $(pH)_A$ is smaller than the $(pH)_{1/2}$, Equation (2) proceeds in the reverse direction of $b$ and the metal is partitioned more into the extraction feed A.

In the process of the present invention, the pH value of the extraction feed A is kept higher than $(pH)_{1/2}$, and by doing this extraction of the metal from the phase A to B is allowed to occur in the direction of $a$. Whereas the pH values of the first extractant B and the second extractant C are maintained at the relation $(pH)_{1/2} > (pH)_C$, the reaction between the phase B and C is caused to occur in the reverse direction $b$.

Figure 3:
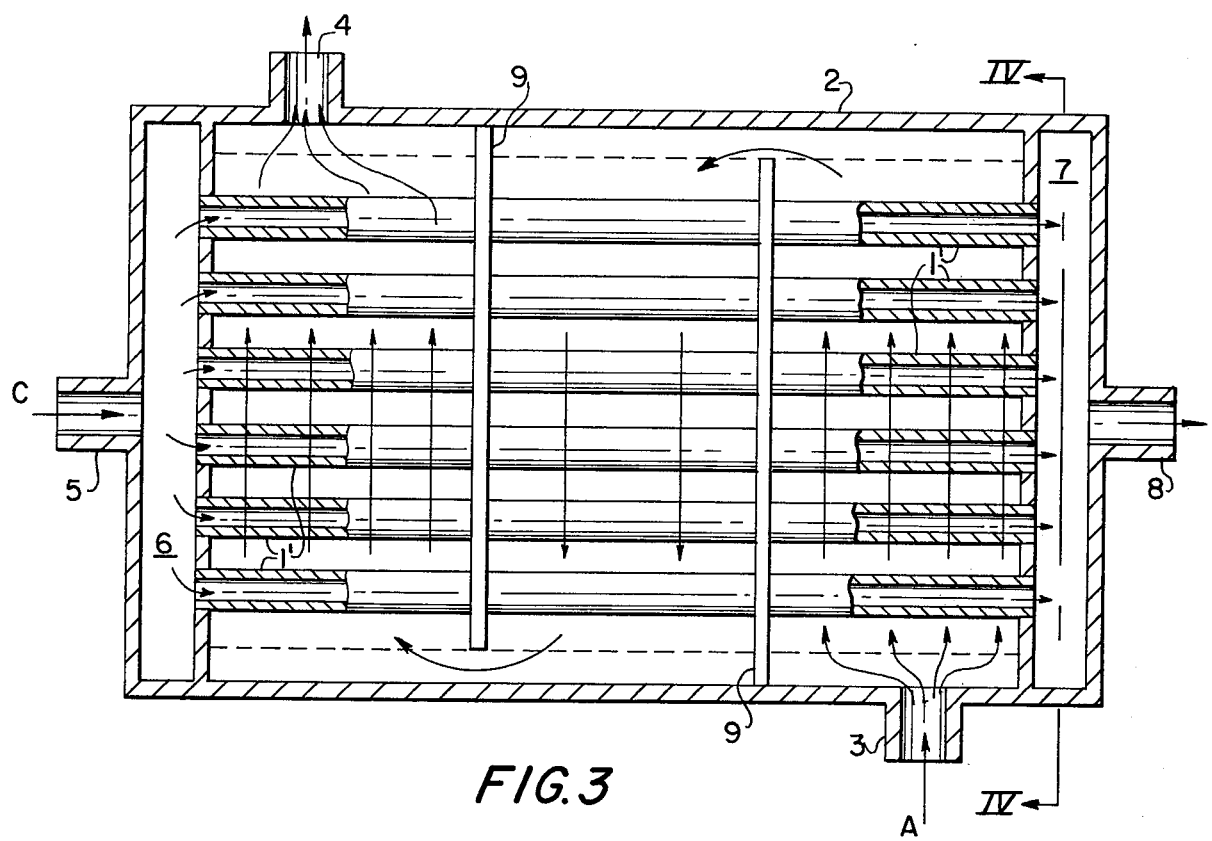
FIG. 3 is a side sectional view of an apparatus of the preferred embodiment of this invention.
Figure 4:
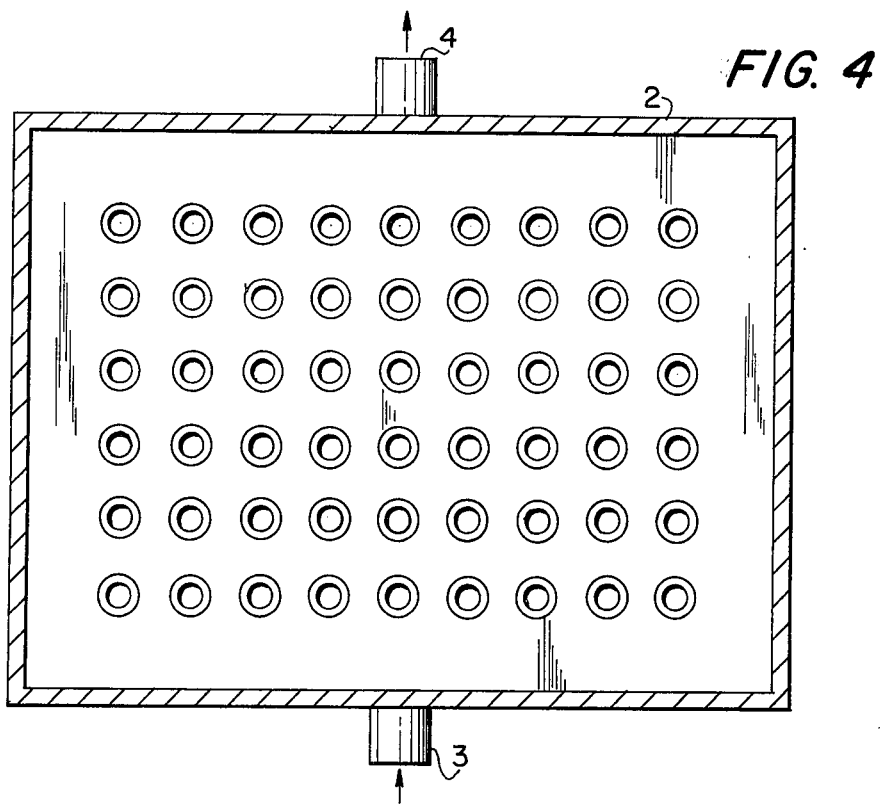
FIG. 4 is a transverse section taken on the line IV - IV of FIG. 3.

Referring to the embodiment of the present invention shown in FIG. 3 and 4 inclusive, the extraction apparatus comprises plurality of porous PTFE tubes 1' impregnated with the first extractant therein held in parallel and in spaced relation to each other by end plates within the casting 2.

Between the two end plates baffles are placed for the following purposes: (1) causing the extraction feed to flow perpendicularly to the tube bundle, and (2) increasing the interstitial linear velocity of the aqueous phase, hence raising the mass-transfer coefficient. The number of baffles is changed depending on the design and efficiency required. Between the end plates and the casing there are formed two chambers 6 and 7, the former being for distributing the second extractant to the tubes and the latter for receiving the extractant discharged from the tubes. To the chambers 6 and 7 an inlet port 5 and an outlet port 8 are connected respectively. To the downstream end of the outlet port 8 there is further connected a conventional apparatus (not shown) to separate the solute (i.e., the extracted metal ion) from the second extractant. On an appropriate position of the sides 2 and 2', an inlet port 3 for entering the extraction feed A and an outlet port 4 for discharging the feed are placed. These inlet and outlet ports may preferably be positioned in the far distant places between the end plates.

In operation, an extraction feed A is caused to flow into the casing from the inlet port 3 to the outlet port 4 while in such a manner as to fill the casing. As the feed solution flows in zigzag, the thickness of the mass-transfer film formed on the tube surfaces 1' is reduced, and the extraction proceeds effectively to give a high mass-transfer coefficient.

The second extractant C is caused to flow into the tubes 1' from the inlet port 5. After passing through the tube length the second extractant containing the objective metal ion is discharged from the outlet port 8, and then flows into a separation apparatus (not shown).

According to the present invention, metals are extracted from their solution in a high efficiency and in a short time. The process of this invention is considered to be useful in fields such as metal ion separation from dilute metal ion containing solution, hydrometallurgy, etc.

The invention will be understood more readily with reference to the following examples, however, these examples are intended to illustrate the invention and are not to be construed to limit the scope of the invention.

EXAMPLE 1 - 9

Figure 2:
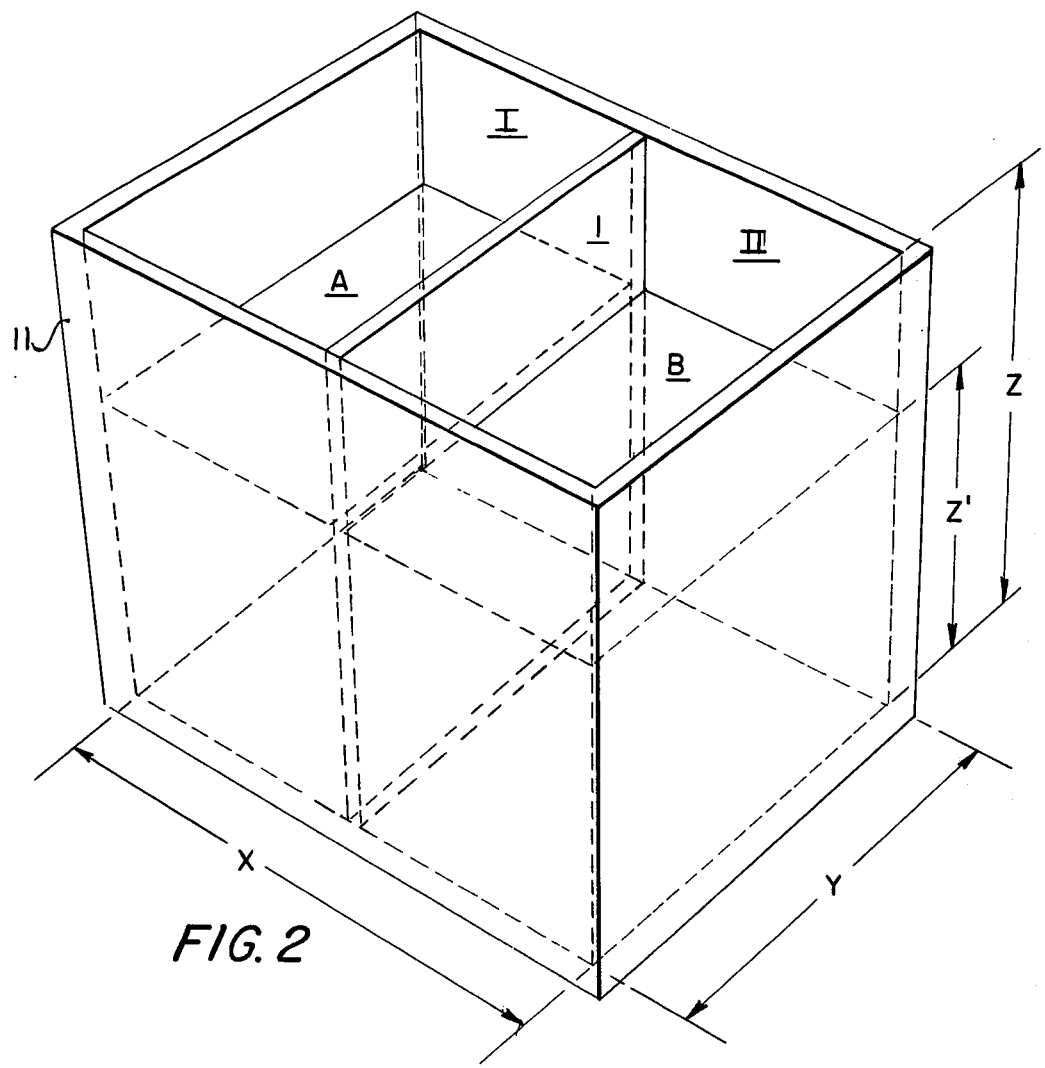
FIG. 2 is a perspective view of the extraction chamber used in Example 1 - 9.

As shown in FIG. 2, a chamber; length (x) 10 cm, width (y) 5.4 cm, and height (z) 10 cm, was produced, and the chamber was separated by a porous PTFE membrane 1 (thickness 0.4 mm, porosity 80%), which membrane was impregnated with the first extractant B and which served as a liquid membrane. Into the first chamber I there was added the second extractant C. Both the amounts added were 190 cc. and they formed a depth of about 7 cm (z'). Both the extraction feed and the second extractant C were sufficiently agitated.

Using the extraction apparatus constructed above, extraction was performed for various extraction feeds, and the extraction rate was measured. The extent of extraction was calculated by the following equation.

extent of extraction (%) = $(1 - \frac{\text{metal ion conc. in extraction feed after contact}}{\text{metal ion conc. in extraction feed before contact}}) \times 100$ The results obtained are shown in the following table.

Table

| Example Number | extraction feed (metal ion containing soln.) | | | | first extraction | second extractant (water) pH adjusted | extent of extraction (%) |
|---|---|---|---|---|---|---|---|
| | type | comp. | conc.* | pH adjusted | | | |
| 1 | $Ag^+$ | $AgNO_3$ | 1.2 | 7.5 | solution of 1.5g of oxine (8-hydroxyquinoline) in 100 cc of chloroform | 5.0 | 90 (after 2 hrs.) |
| 2 | $Pb^{2+}$ | $Pb(NO_3)_2$ | 0.72 | 6.1 | | 4.0 | 92 (after 2 hrs.) |
| 3 | $Co^{2+}$ | $CoCl_2$ | 1.0 | 4.3 | | 2.0 | 91 (after 2 hrs.) |
| 4 | $Cu^{2+}$ | $CuSO_4$ | 1.1 | 3.0 | | 0.5 | 95 (after 2 hrs.) |
| 5 | $Fe^{3+}$ | $FeCl_3$ | 0.9 | 2.5 | | 0.4 | 86 (after 2 hrs.) |
| 6 | $Mn^{2+}$ | $MnSO_4$ | 1.1 | 6.7 | | 4.2 | 93 (after 2 hrs.) |
| 7 | $Ni^{2+}$ | $NiSO_4$ | 1.0 | 7.0 | | 4.1 | 85 (after 2.5 hrs.) |
| 8 | $Co^{2+}$ | $CoCl_2$ | 1.0 | 5.2 | solution of 4.2g of TTA (thenoyltrifluoroacetone) in 100 cc benzene | 3.2 | 92 (after 2 hrs.) |
| 9 | $Cu^{2+}$ | $CuSO_4$ | 1.1 | 2.3 | | 0.5 | 94 (after 2.5 hrs.) |

*conc. = $\times 10^{-2}$ mol/l

EXAMPLE 10

In an apparatus having similar construction to FIG. 3 and 4, a 80 mm $\phi$ glass cylinder contained 52 porous PTFE tubes (mean porosity 70%; pore size $2\mu$ (max)), which were each 6 mm in O.D., 4 mm in I.D., about 750 mm in length, and 1.0 mm in wall thickness, held in a right triangular arrangement with 7 mm center to center pitch. The ends of the tube bundle were fixed with end plates, between which 30 baffle plates so that the feed solution flowing outside the tube might flow perpendicularly to the tube. The fine pores of the porous PTFE tubes were impregnated with an organic solution of a chelating agent (TTA $1.3 \times 10^{-3}$ mol/l in benzene/silicone oil).

From the inlet port 3 a feed solution of $CuSO_4$ (concentration $1.0 \times 10^{-3}$ mol/l, pH 5.2) was allowed to flow into the passage outside the tube at a flow rate of 0.5 cm/sec, i.e. 441 cc/min). Into the inlet 5 for the tube bundle, a $1.0 \times 10^{-3}$ mol/l $CuSO_4$ (pH 3.1) was caused to flow at an appropriate flow rate. (The flow rate does not substantially affect the extraction efficiency, but it mainly depends on the pH of the second extractant.)

By measuring the ion concentration of the discharged solution at the outlet, an overall extent of extraction of 94.5 percent was obtained.

EXAMPLE 11

Extraction was performed using the same apparatus and under similar conditions to those of Example 10, except that an aqueous $MnSO_4$ solution (conc. $0.90 \times 10^{-3}$ mol/l, pH 6.5) was used as the extraction feed solution outside the tube, an aqueous $MnSO_4$ solution (conc. $2.0 \times 10^{-3}$ mol/l, pH 4.2) as the extractant solution inside the tube, and an organic solution of 15g of oxine in 1 liter $CHCl_3$ as the chelating extractant.

The $MnSO_4$ concentration of $0.063 \times 10^{-3}$ mol/l was obtained in the discharged solution; i.e., the overall extent of extraction being 93 percent.

What is claimed is:

1. A continuous liquid-liquid extraction process of extracting heavy metal cations from an aqueous solution extraction feed containing said cations, which process comprises bringing said aqueous solution into contact with one side of a chemically resistant membrane, said membrane having continuous fine pores impregnated and filled with a first organic extractant containing a chelating agent, and bringing a second aqueous extractant in contact with the other side of said membrane, while maintaining the pH value of the extraction feed greater than that of the second extractant, whereby said heavy metal cations dissolved in said feed solution are transferred from said extraction feed to said first extractant supported in said fine pores with complexing, through said membrane, due to the decreasing concentration of the metal chelate and into said second extractant from said membrane with regeneration of the chelating agent and release of said metal cation.

2. The process of claim 1 in which the pH values of the extraction feed, the first extractant, and the second extractant are in decreasing order.

3. The process of claim 1 in which said chelating agent is one selected from the group consisting of β-diketones, quinolines, oximes, dioximes, dithizones and mixtures thereof.

4. The process of claim 1 in which said chelating agent is one selected from the group consisting of acetylacetone, trifluoroacetylacetone, dibenzoylmethane, thenoyltrifluoroacetone, 8-hydroxyquinoline, N-nitroso-phenylhydroxylamine, N-furoylphenylhydroxylamine, dithizone, and mixtures thereof.

5. The process of claim 1 in which said organic extractant is one selected from the group consisting of benzene, toluene, xylene, carbon tetrachloride, chloroform, methylethylketone, acetone, methylisobutylketone, kerosene, silicone oil, chlorinated hydrocarbons and mixtures thereof.

6. The process of claim 1 in which said membrane is one selected from the group consisting of porous polymeric film, paper filter, non-woven cloth and fibrous filter.

7. The process of claim 1 in which said membrane is expanded porous polytetrafluoroethylene.

* * * * *